United States Patent
Van Opdorp

(10) Patent No.: US 9,457,298 B2
(45) Date of Patent: Oct. 4, 2016

(54) ELECTRICITY-FREE WATER PURIFICATION INSTALLATION WITH A MEMBRANE FILTER AND A SYSTEM OF AUTOMATIC BACKWASHING OF THE FILTER

(76) Inventor: Robertus Martinus Van Opdorp, Amsterdam (NL)

( * ) Notice: Subject to any disclaimer, the term of this patent is extended or adjusted under 35 U.S.C. 154(b) by 461 days.

(21) Appl. No.: 14/131,176

(22) PCT Filed: Jul. 5, 2012

(86) PCT No.: PCT/NL2012/000044
§ 371 (c)(1),
(2), (4) Date: Jan. 6, 2014

(87) PCT Pub. No.: WO2013/006036
PCT Pub. Date: Jan. 10, 2013

(65) Prior Publication Data
US 2014/0190877 A1    Jul. 10, 2014

(30) Foreign Application Priority Data

Jul. 6, 2011 (NL) .................... 1038928

(51) Int. Cl.
*B01D 29/66* (2006.01)
*C02F 1/44* (2006.01)
(Continued)

(52) U.S. Cl.
CPC .............. *B01D 29/66* (2013.01); *B01D 61/18* (2013.01); *B01D 65/02* (2013.01); *C02F 1/44* (2013.01); *B01D 2201/583* (2013.01);
(Continued)

(58) Field of Classification Search
CPC .. C02F 2201/009; C02F 1/002; C02F 1/003; C02F 2201/005; C02F 1/44; B01D 2313/24–2313/246; B01D 2201/58–2201/583; B01D 2313/243; B01D 2313/18; B01D 2313/19; B01D 2313/36; B01D 2321/04; B01D 2321/12; B01D 2321/24; B01D 2321/40
See application file for complete search history.

(56) References Cited

U.S. PATENT DOCUMENTS 3,365,061 A * 1/1968 Bray ..................... B01D 61/08
                                                          210/130
4,187,173 A * 2/1980 Keefer .................. B01D 61/06
                                                          210/136
(Continued)

FOREIGN PATENT DOCUMENTS

AT      11 812 U2     5/2011
DE   100 44 713 A1    4/2002
(Continued)

*Primary Examiner* — Krishnan S Menon
*Assistant Examiner* — Liam Royce
(74) *Attorney, Agent, or Firm* — Birch, Stewart, Kolasch & Birch, LLP

(57) ABSTRACT

Electricity free operating water purification installation with a membrane filter and a system of automatic backwashing of that filter characterized in that during the operation a fixed percentage is diversed from the outflow of filtered water and is stored in a container under progressive pressure, which to a certain maximum pressure is cut of from a feedback to the membrane filter, so that consequently after filtration of a certain volume of polluted water through the membrane filter the pressure in the container will exceed the maximum resistible pressure by the one way closure, which then will open so that the contents of the container will be forced back through the membrane filter under higher pressure than the original filtration pressure, whereby is provided in automatic closure after the container is emptied.

7 Claims, 3 Drawing Sheets

(51) Int. Cl.
   *B01D 65/02*   (2006.01)
   *B01D 61/18*   (2006.01)

(52) U.S. Cl.
   CPC .. *B01D 2313/243* (2013.01); *B01D 2313/246* (2013.01); *B01D 2313/46* (2013.01); *B01D 2313/50* (2013.01); *B01D 2321/04* (2013.01); *B01D 2321/12* (2013.01); *C02F 2201/006* (2013.01); *C02F 2201/009* (2013.01); *C02F 2303/16* (2013.01)

(56) References Cited

U.S. PATENT DOCUMENTS

| | | | | |
|---|---|---|---|---|
| 4,793,379 A | * | 12/1988 | Eidsmore | F16K 1/306 137/460 |
| 5,282,972 A | * | 2/1994 | Hanna | B01D 61/025 210/137 |
| 5,531,887 A | * | 7/1996 | Miers | B01D 61/10 210/134 |
| 2005/0205478 A1 | * | 9/2005 | Kung | B01D 61/12 210/106 |
| 2010/0193424 A1 | * | 8/2010 | Scharstuhl | B01D 61/20 210/321.61 |

FOREIGN PATENT DOCUMENTS

| | | |
|---|---|---|
| DE | 103 02 014 A1 | 7/2004 |
| FR | 2 699 830 A1 | 7/1994 |
| FR | 2 736 844 A1 | 4/2007 |
| WO | WO 2007/038894 A1 | 4/2007 |
| WO | WO 2009/019592 A2 | 2/2009 |

* cited by examiner

ELECTRICITY-FREE WATER PURIFICATION INSTALLATION WITH A MEMBRANE FILTER AND A SYSTEM OF AUTOMATIC BACKWASHING OF THE FILTER

The subject of this patent is a water purification installation with a membrane filter and a system of automatic backwashing of the filter, which can work without the use of electronic measuring & control technology or an electric drive.

Electrical power is not readily available in many regions of the world, and clean water is often a scarce or even inexistent good. Modern water treatment installations commonly use membrane filter technology, where frequent backwashing of the filters for cleaning is a condition for sustainable operation. In the current systems, this backwashing is regulated electronically, and electrical power is indispensable to the functioning of the electronic measuring & control equipment and the multiple filters. This includes measuring when a given filter needs to be rinsed, generally followed by the use of the contents of one of the filters or the supply from a reservoir to rinse the other filter under higher pressure with the help of an electrically operated pump.

This means that the existing systems cannot be used in areas where electric power is lacking or its supply unreliable.

The aim of the present invention is to achieve a system—reliable in operation and easy to maintain—for the automatic backwashing of membrane filters in a water treatment plant without the use of electrical measuring & control technology or an electric drive, for the production of drinking water which can be used publicly as a water supply, e.g. in areas where there is no electricity available.

The application 2009/019592 describes a plant that features membrane filters and a device to clean those filters by means of backwashing with the use of a simple pumping mechanism. This plant is clearly intended for small-scale use, and theoretically appears to satisfy the specified objective in such circumstances. In practice, however, backwashing under such low pressure and with such small amounts is insufficiently effective. Moreover, this system presupposes a deliberate action from the user for backwashing, which means that regular cleaning cannot be guaranteed—especially when the plant is operated by several users at the same time.

Patent application FR2699830 also describes a water treatment installation with a backwashing system. In this case, a portion of the treated water is stored for the purpose of backwashing in a reservoir at a pressure not exceeding the supply pressure of the pump. This system does not satisfy the demand of backwashing being possible at a pressure above supply pressure. A further disadvantage is that the supply pump is constantly experiencing counter-pressure, since a pressure limiting valve placed on the outlet opens and closes with each pump stroke due to the rising pressure as soon as the reservoir is completely filled, causing water to flow from the outlet. Furthermore, this backwashing system is not automated, since backwashing is initiated at the moment that the wastewater tank level drops below a certain level, which stops the pump and causes the existing pressure in the system to generate a reverse flow through the filter under the assumption that a discharge valve will open due to the dropping pump pressure. This cannot be assumed, however, since, according to the patent application, backwash pressure will still be applied to that valve.

Patent application DE 10044713 A1 describes a treatment installation with a backwashing system for the filter which comprises a piston unconnected to the supply pump, which moves back and forth by means of pressurised air in a cylinder. This sucks in purified water to then press it back through the filter again at a pressure limited by a pressure limiting valve. Due to the nature of the system, little purified water is washed back, and the plant is not suitable for purifying water for human consumption. It is also not intended for this purpose, as specified in the text (p. 1 (002), lines 4 to 6). Moreover, it is not clear that backwashing proceeds automatically, and, if it does, certainly not how.

Patent application DE 10302014 A1 describes a backwashing system which comprises a pressure container for the storage of treated water. This allows treated water to be washed back without a pump by opening an outlet on the wastewater side of the filter. Pressure containers have been used in backwashing systems for some time. By specifying the possibility to fill the pressure container first just before backwashing, so that, in normal operation, the pump does not need to work against the pressure building up in the pressure container, and from the fact that backwashing needs to be activated by opening an outlet on the wastewater side of the filter, the application illustrates, among other things, that this system fails to meet the objective of automatic backwashing as specified in the introduction of this application.

The independence of the user of the pump during backwashing of freshwater through the filter, in a way which is timely, comprehensive and deploys sufficient pressure, is an important requirement for a water treatment installation that can be deployed universally and used by anyone without guidance. The existing patents provide no method or device for automatic backwashing which would meet this objective.

The most recent utility model AT 11812U2 also does not satisfy the requirement for this type of automatic backwashing.

None of the solutions proposed above are fully compliant with the stated purpose, especially the requirements that backwashing take place in a timely fashion without requiring a deliberate action by the user, and that a sufficient quantity of filtered water under substantially higher pressure—preferably two times higher—than the supply pressure be washed back through the filter in a continuous flow.

It is the purpose of the invention to develop—under the circumstances described in the introduction—a water treatment plant comprising at least one membrane filter equipped with an automatic backwashing system, which allows an amount of filtrate at least equal to the contents of the filter to be pressed back through the filter and discharged from there in a continuous flow under pressure above supply pressure, all of this after the treatment of a certain amount of water and without the use of electrical power and/or electronic measuring & control technology, and without deliberate actions from the user.

The invention proposes for this purpose a water treatment plant featuring a membrane filter and a system of automatic backwashing of the filter, which is characterised in that a fixed percentage of the outflow of filtered water from a membrane filter is pumped through a pressure-limited one-way-valve into a rinsing water container by a pump with a calculated output and pressure capacity in which counter pressure (above the hydraulic pressure with which the water is filtered) is created by any possible method revealed in prior art—e.g. with a bellow. The rinsing water container should, in principle, be sealed off at a certain pressure from a feedback to the relevant membrane filter by any possible means revealed in prior art, but preferably via a pressure-limiting seal which can be opened and closed as described in conclusion 5 and 6 of this patent whereby opening of this pressure limiting seal by overpressure, by means of any known technique—but preferably via a method described—is linked to a more or less simultaneous interruption of the inflow of filtrate from the membrane filter & the discharge of filtrate to the outlet, and the opening of a drain on the wastewater entrance of the membrane filter, ensuring that rinsing water can be washed back to the relevant drain only via the membrane filter. In this context, the mutual relationship of the capacity of the pump, the counter pressure in the rinsing water container, the pressure resistance of the pressure limiting seal, and the volume of the rinsing water container can, of course, be determined freely, but should preferably be set so that, after the filtration of a certain amount of wastewater, the rinsing water container is, under the maximum pressure permitted by the pressure limiting seal, filled with sufficient filtrate to wash back a volume at least equal to the content of the membrane filter or filters which are to be washed under a pressure which is at least twice the supply pressure at which the wastewater is filtered.

The pressure limiting seal is formed by a closing component (10) in the flow path from the filter to the rinsing water container (8), which can move between a position in which it closes the connection between the rinsing water container (8) and the feedback (12) to the membrane filter and a component (9b) linked to the closing component (10) and a magnetically linkable component (9a) fixed with respect to the rinsing water container, by means of which the closing component (10) is fixed in the sealed position with a magnetic force which corresponds to the maximum pressure that intentionally has to be reached in the rinsing water container (8), where the actual pressure in the rinsing water container (8) affecting the closing component (10) results in a tensile force on the magnetic link (9) with the opposite effect to that of the magnetic force.

The pressure limiting seal on the connection between the rinsing water container (8) and the feedback to the membrane filter (3) is formed by a piston (10) which moves axially in a cylinder, and which, in the closing position (FIG. 1), is magnetically connected to a component (9a) which is fixed relative to the rinsing water container, whereby in the closing position the piston (10) closes off a feedback from the rinsing water container (8) to the membrane filter (12) and after the magnetic link (9) is interrupted as a consequence of overpressure in the rinsing water container, the piston is moved in an axial direction against the pressure of a coil spring (11) to a temporary position (FIG. 2.) in which the connection between the rinsing water container (8) and the feedback (12) is left open for as long as rinsing water is pressed out of the rinsing water container (8).

The simultaneous blocking or passage of filtrate and rinsing water during the opening and closing of the pressure limiting seal is effected by means of indirectly controlled magnet valves (13 and 14), whereby a rod magnet positioned in each valve is controlled by two movable permanent magnets with polarisation opposite to each other, placed in sequence alongside the internal rod magnet outside that valve. The valves are mounted on the housing (18) of the pressure limiting seal of the rinsing water container in such a way that the they are opened and closed by interaction between the rod magnets placed in the valve (FIGS. 3, 13a and 14a) and the oppositely polarised permanent magnets (15a, 15b, 15c and 15d) placed in an axial direction one behind the other on the moving component (10) of the pressure limiting seal.

The pressing of water through a membrane filter and the diversion of a fixed percentage of the outflow of filtrate from the membrane filter to a rinsing water container, as well as the construction of a pressure limiting seal and the associated interruption of the flow and opening of discharge channels during the opening of the seal, may, naturally, be realised by means of various existing non-electrical mechanical methods. Pressure limiting valves known from prior art open in case of overpressure but close as soon as the overpressure ceases. In the proposed system, however, the valve must remain open until the desired volume is pressed out of the rinsing water container. This could theoretically be ensured by temporarily blocking the sealing component by means of an activated timing mechanism during opening. Such mechanisms, however, are fragile and require maintenance, because various types of seals must be provided in the places where the hydraulic circuit is penetrated from the outside by shafts and the like, required for the control of valves or other moving parts. This also holds for simultaneous closing and opening of valves and similar elements for the purpose of controlling the flow of wastewater and filtrate at the time of opening and closing of the pressure limiting seal.

To better satisfy this objective and make the water treatment plant easy to maintain and more reliable in operation, the invention includes two preferred technical solutions: A magnetic pressure limiter embedded in the hydraulic circuit and a membrane valve embedded in the hydraulic circuit for the closing and opening of the inflow of filtrate and wastewater.

Figure 1:
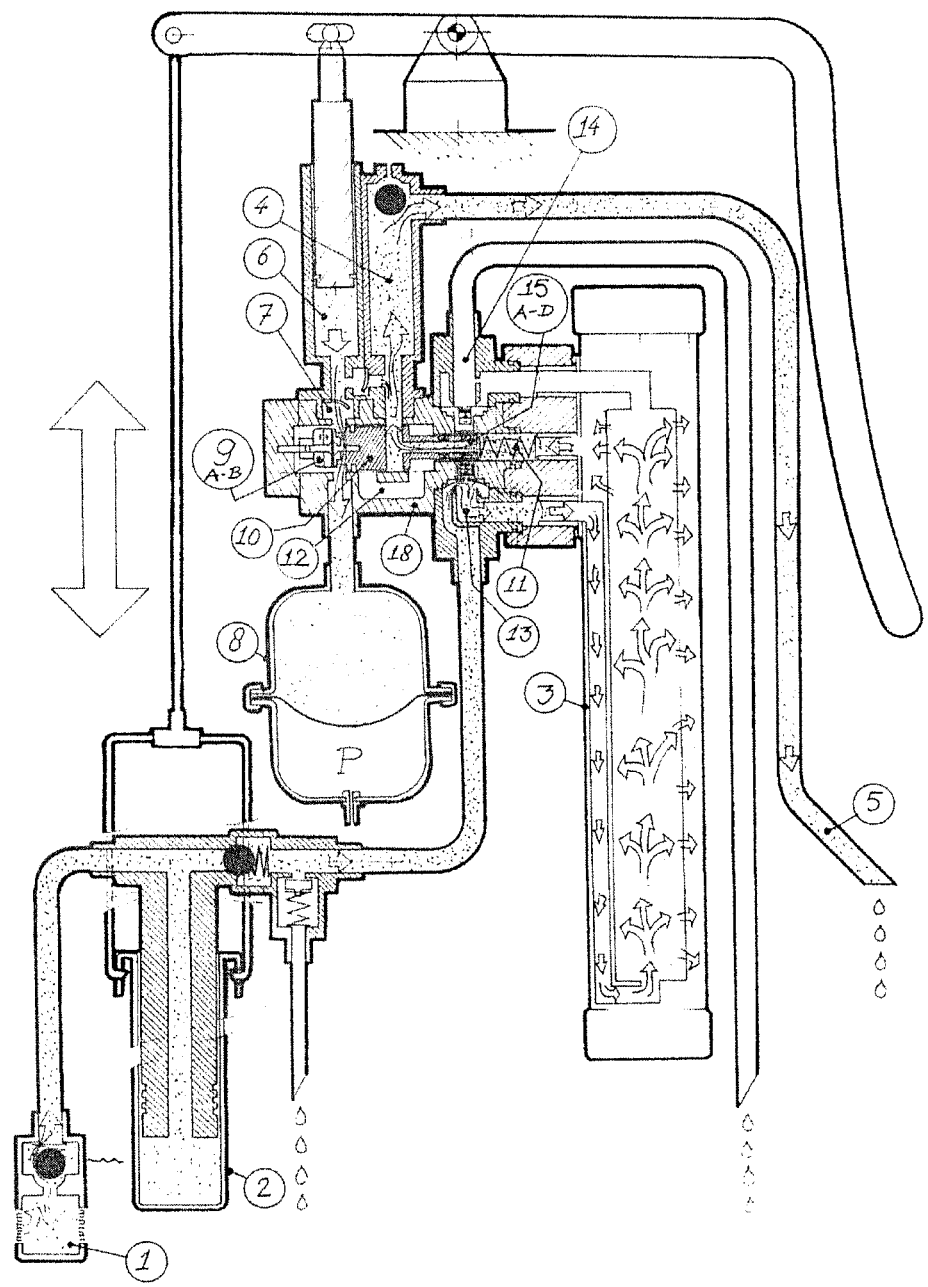
FIG. 1 illustrates, in schematic view, and partly in cross-section, an embodiment of a water treatment plant according to the present invention, during filtration.
Figure 2:
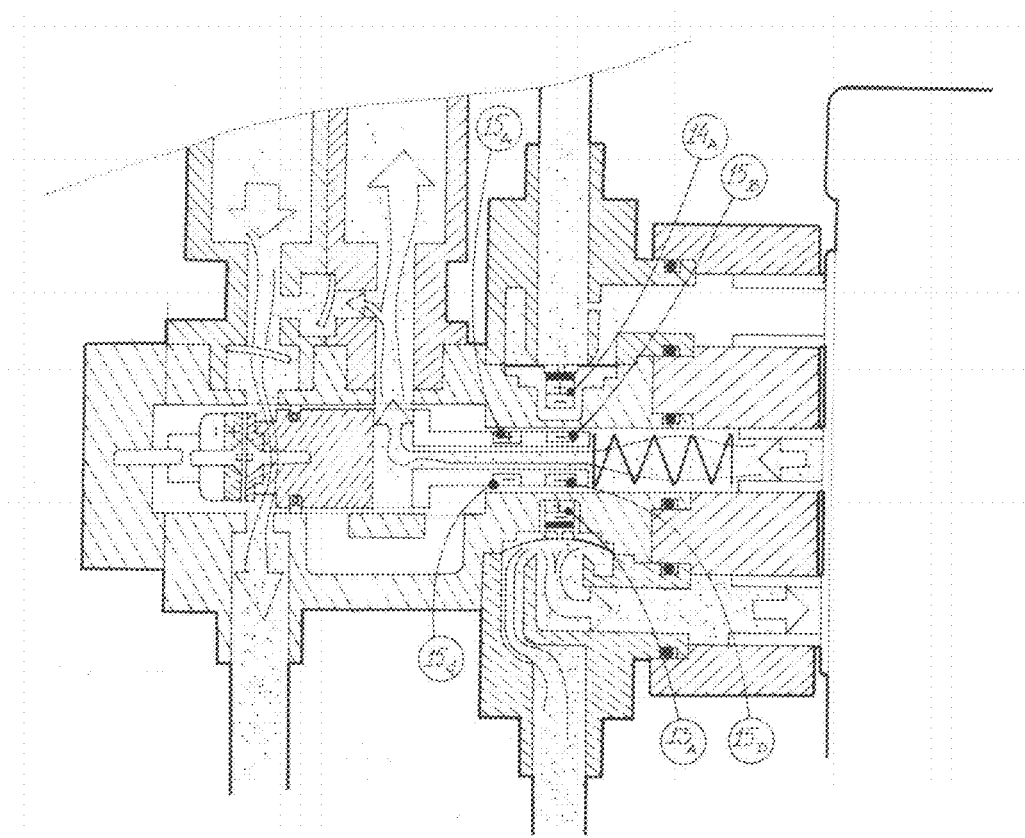
FIG. 2 illustrates, in schematic view, and partly in cross-section, a detail of the embodiment of the water treatment plant of FIG. 1, during filtration.
Figure 3:
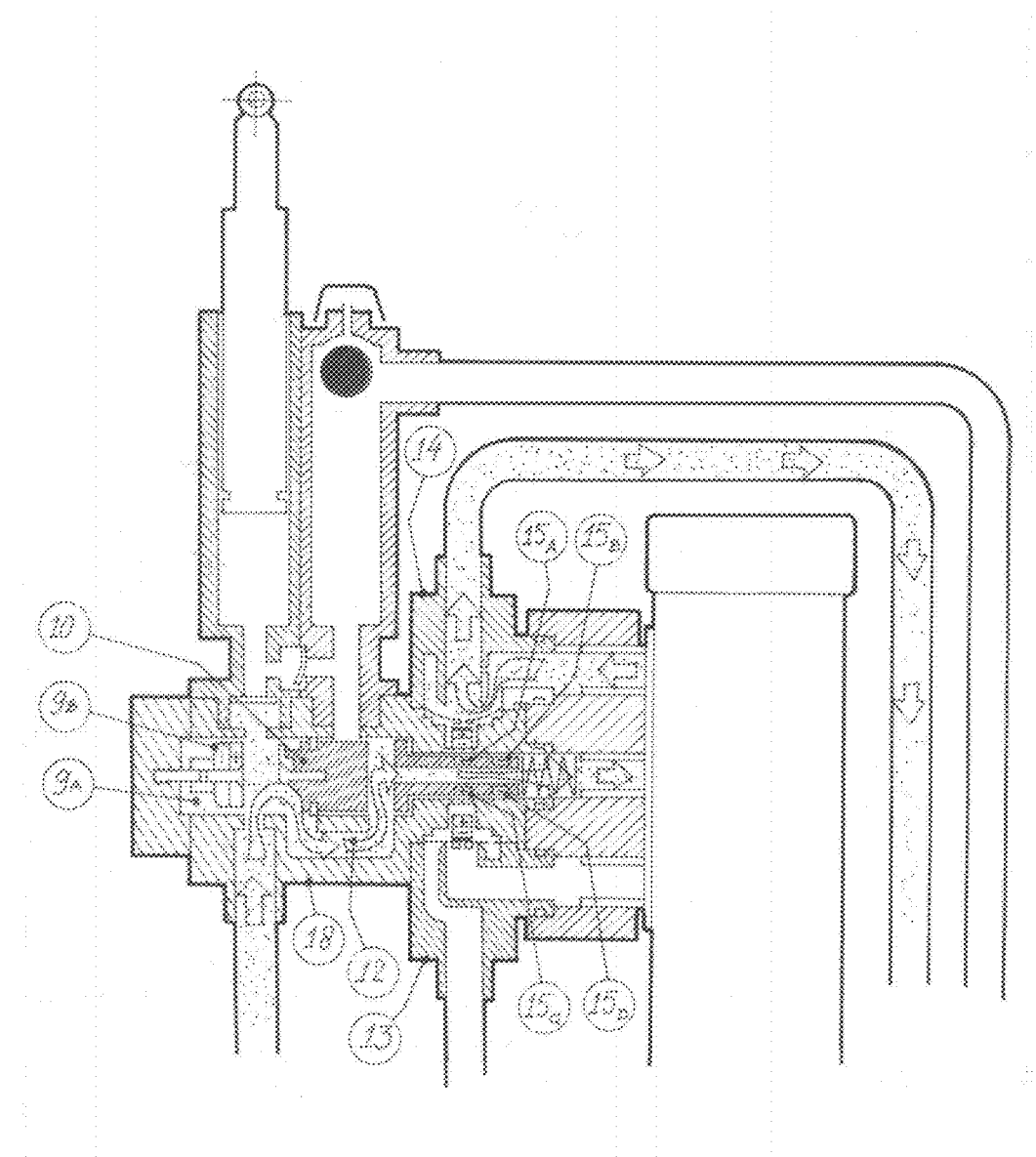
FIG. 3 illustrates, in schematic view, and partly in cross-section, a detail of the embodiment of the water treatment plant of FIG. 1, during backwashing.

The proposed realisation comprises a) a supply pump (2), which can be operated physically by means of a lever, and extracts the water to be treated from a wastewater source (1), pushes it through a membrane filter (3) via an overflow reservoir (4) to an outlet (5), and b) a secondary pump (6), run in parallel with the supply pump (2) and with a smaller flow, which diverts part of the filtrate from the lower region of an overflow tank (4) and pumps it onwards to a rinsing water container (8) under counter pressure by means of a one-way valve (7). The container is closed off from a feedback (12) by means of a closing component (consisting of a piston (10) held in a closing position by a magnetic link (9) of two magnetically connected parts (9a and 9b)) until the pressure in the rinsing water container exceeds the strength of the magnetic link, interrupting it and moving the piston (10) into a position where the feedback passage (12) to the membrane filter is left open. The simultaneous opening of a drain for the discharging of the water that has been washed back through the filter and the closing of the inflow from the supply pump (2) are effected by means of indirectly controlled magnetic valves (13 and 14) mounted on the outside of the housing (18) of the piston (10), which are placed in an open and closed position not via electromagnetically controlled iron pins but by rod magnets (13a and 14a) by means of oppositely polarised permanent magnets (15a, 15b, 15c and 15d) placed in an axial direction on the piston (10) one behind the other. The drain to the outlet (5) is simultaneously closed off by the piston (10). An overpressure valve placed in front of the membrane valve, with a feedback to the wastewater source, prevents damage or disruption of the backwashing in cases where pumping continues during the backwashing process.

After the rinsing water is pressed out of the container by the counter pressure (P), a coil spring (11) pushes the piston (10) back in the opposite direction, the magnetic link (9) is restored, the controlled membrane valves are placed back into their initial position by the magnets (15*b* and 15*d*), the drain (5) to the outlet is again freed up by the piston (10), and the process starts again.

The invention claimed is:

1. An electricity-free water treatment plant, comprising:
   a membrane filter; and
   a supply pump configured to be operated physically to extract water to be treated from a water source, and to push the water source with a pressure from a water entrance through the membrane filter to an outlet to produce filtrate, in a filtering process;
   a rinsing water container, comprising a counter pressure generator;
   a non-electric secondary pump configured to divert, during the filtering process, a part of the filtrate through a one-way valve into the rinsing water container; and
   a pressure limiting seal configured to be opened and closed, which seal is not electronically controlled, the seal sealing off the rinsing water container at a certain pressure from a feedback to the membrane filter, wherein the seal is configured to be non-electronically opened by overpressure, to substantially simultaneously interrupt the inflow of filtrate from the membrane filter, to close the drain to the outlet, and to open a drain on the wastewater entrance of the membrane filter, thereby allowing rinsing water from the rinsing water container to be discharged after backwashing through the membrane filter.

2. The water treatment plant according to claim 1, wherein the counter pressure generator comprises a bellow.

3. The water treatment plant according to claim 1, wherein the supply pump and the secondary pump are pulse pumps with a combined drive and different output rates, of which the supply pump has the higher output, while the secondary pump has the smaller output.

4. The water treatment plant according to claim 1, wherein the water treatment plant is configured to cause to correspond to each other:
   a percentage of filtrate to be diverted,
   the contents of the rinsing water container and the counter pressure generated within it,
   the pressure capacity and output of the secondary pump, and
   a maximum pressure resistance of the pressure limiting seal,
such that, after the filtration of a given volume of wastewater, the rinsing water container, under a maximum pressure permitted by the pressure limiting seal, is filled with sufficient filtrate to wash back one time through the membrane filter a volume equal to the content of the membrane filter, and under a pressure which is at least twice the filtering pressure.

5. The water treatment plant according to claim 1, wherein the pressure limiting seal comprises:
   a closing component in a flow path from the filter to the rinsing water container, wherein the closing component is configured to be moved between a position in which the closing component closes the connection between the rinsing water container and a feedback to the membrane filter; and
   a magnetic link comprising a component linked to the closing component and magnetically linkable by a magnetic force to a component fixed with respect to the rinsing water container, such that the closing component is fixed in the sealed position with a magnetic force which corresponds to a maximum pressure to be reached in the rinsing water container, where the actual pressure in the rinsing water container affecting the closing component results in a tensile force on the magnetic link with the opposite effect to that of the magnetic force.

6. The water treatment plant according to claim 5, wherein the closing component is formed by a piston which is configured to move axially in a cylinder, and which, in a closing position, is magnetically connected to the component which is fixed with respect to the rinsing water container, whereby in the closing position the piston closes off a feedback from the rinsing water container to the membrane filter and, in a temporary position wherein the magnetic link is interrupted as a consequence of overpressure in the rinsing water container, is moved in an axial direction against the pressure of a coil spring, in which temporary position a connection between the rinsing water container and the feedback is open for as long as rinsing water is pressed out of the rinsing water container by the counter pressure generator.

7. The water treatment plant according to claim 1, comprising indirectly controlled magnet valves configured to simultaneously effect blocking or passage of filtrate and rinsing water during the opening and closing of the pressure limiting seal, whereby an internal rod magnet positioned in each valve is controlled by two movable permanent magnets with polarisation opposite to each other, placed in sequence alongside the rod magnet outside that valve, wherein the magnet valves are mounted on a housing of the pressure limiting seal such that they are opened and closed by interaction between the rod magnets placed in the valve and oppositely polarised permanent magnets placed in an axial direction one behind the other on a moving component of the pressure limiting seal.

* * * * *